Patented Mar. 4, 1941

2,233,875

UNITED STATES PATENT OFFICE 2,233,875

LAMINATED BOARD AND METHOD OF MAKING SAME

John H. Schmidt and Ralph T. Casselman, Bloomfield, N. J., assignors, by mesne assignments, to Union Carbide and Carbon Corporation, New York, N. Y., a corporation of New York No Drawing. Application January 13, 1937, Serial No. 120,403

17 Claims. (Cl. 154—2)

This invention relates to stratified and joined materials, for instance, comprising joints or layers of wood or other material bonded with an adhesive such as may be used in the production of airplane propellers, pianos, furniture, etc., where a durable, permanent construction is desired. It is the general object of the present invention to improve the art relating to this class of finished or semi-finished materials. The invention will be described more particularly as it relates to veneering.

Those who now produce these composite products usually follow the old gluing processes of spreading glue upon the joints or sheets of wood or other material, laying up the wood sheets or joints and then holding them together under pressure until the glue has hardened to substantially its full strength. A difficulty with the usual wet gluing process is that the glues which are suitable for commercial use are not sufficiently durable to provide a permanent bond under all conditions to which the composite material may be put. The water glues, blood, casein, animal, vegetable, etc., deteriorate markedly in the presence of moisture and are attacked by bacteria and insects. In the case of veneers it has been proposed to substitute various phenolic resins as the adhesive and submit the stacked sheets of wood to the simultaneous application of heat and pressure until the resin has taken its final hardened form. A difficulty with the previously proposed processes using synthetic resins is that expensive special apparatus is required so that the resin may be set to its final condition under heat and pressure; and with the resin adhesive the simultaneous application of heat and pressure either must be prolonged, where a large stack of material is treated, in order to permit the heat to penetrate to the center of the stack and react the resinous material, thus tieing up equipment, or the heat injures the outer layers of wood; in other words, if the temperature is low enough to prevent the deterioration of the wood next to the heated platens, the process is in many cases too slow for commercial practice, and if the temperature is high enough to give a reasonable speed of hardening the adhesive in the interior of a large stack, the wood of the layers which are next to the heated platens is damaged. In the case of materials which are not flat sheets, it is extremely difficult to submit them to the simultaneous application of heat and pressure in a press.

By the present invention we overcome the practical objections to prior processes and produce stratified and joined material having a permanent bond, using a resin adhesive of such character that the composite material may be produced in the usual plant with the usual equipment and by persons who have experience in the gluing art but are unfamiliar with the intricacies of obtaining satisfactory materials by the use of simultaneous heat and pressure methods and heat hardening resins. We have thus endeavored to develop as simple and as practical a process as is possible for producing a better grade of stratified material, providing for the use of customary equipment and an increased speed of production. We obtain the benefits previously associated with hot press methods but are able and prefer to avoid use of the hot press and eliminate its disadvantages.

The value of any binder lies in the adhesive strength developed and maintained in actual service. The importance of this has long been recognized, but there has been a general disregard of the fact that the factors which influence the strength obtainable, are different and unique for every type of ingredient and particularly for mixtures of ingredients. This has led to numerous failures in the practical use of synthetic resins as veneer and joint bonds, since these factors affect one another in unexpected ways as they relate to the adhesive strength of any particular resin bond. In general, formulations which are practical and may be applied commercially are the object of the present invention.

One of the most important factors which influences the strength obtainable in a veneer or joint bonded with a synthetic phenol-formaldehyde resin is found to be the consistency of the resin solution, both at the time of applying it to the wood ply and especially at and during the time of the bonding operation. The consistency, however, is influenced by and should be correlated to other factors of the bond.

A resin solution of too low consistency when applied to the ply will deposit only a thin film which will flow readily when pressure is applied and leave less resin between the plies or joints than is necessary to impart the greatest strength; or the resin solution may penetrate too deeply into the wood and bleed into the veneer or joint and this also results in a deficiency in the quantity of resin bond between plies and at the joint. A solution of too high consistency, on the other hand, will not spread readily and will require an increased pressure to give the necessary flow. Penetrability will also be too low and the strength of the bond consequently be decreased.

The consistency of synthetic resin solutions is found to be dependent on certain factors such as the proportions of the reactants, the nature of the catalyst, whether acidic or basic, and the time and temperature of the reaction. It has been found that an increase in the aldehyde ratio in excess of molar, other conditions being the same, results in a more viscous solution, while an increase in the phenol ratio gives a more fluid reaction mixture. An increase in catalyst results in a more viscous end product, other conditions being the same.

It is found that the use of alkaline catalysts favors the reaction with the higher ratios of formaldehyde and formation of resins of the reactive type. Solutions of such resins are usually of a higher consistency than those obtainable with acid catalyzed resins. An increase either in time or temperature of reaction usually means an increase in consistency. It is apparent, therefore, that the consistency may be decreased or increased in a variety of ways but it is not obvious which method should be employed to arrive at that consistency and composition which will give the strongest bond when such solutions are used for the production of wood veneers or joints.

It is found that another factor which must be taken into account, if the resin solution best adapted for the bonding of veneers and joints is to be obtained, is the change in consistency which occurs in such resin solutions just previous to their use; second, after their application; and third, during the hardening or setting of resin bond. As is well known, the phenol formaldehyde reaction is, once started, a progressive one and in a wet, potentially reactive condition the condensation-polymerization will usually continue and the resin or resin solutions increase in consistency. The change in consistency represents a change in the state of the resin which affects the bonding material and its use. This increase in consistency can, of course, be compensated to some extent by the addition of more solvent but this obviously means a decrease in resin concentration which, with the added factor of the changed state of the resin, requires that adjustments be made in the application of the solution such that a thicker film of material is applied and the material does not penetrate so well nor is the bond so strong and the thicker film may be unsightly; further, it means that a greater quantity of solvent must be evaporated and it may eventually result that the consistency of the material increases to such an extent that it is no longer dispersible in solvents. Such material is, of course, useless and of no value. Methods must be devised, therefore, to retard this change in consistency to a point where the material is commercially usable and yet it must not be so completely retarded that the resulting material does not harden or set within the commercial limits of time and temperature.

The change in consistency during the hardening or set of the resin bond is found to be particularly important. It is during this hardening that the resin solutions become plastic solids and attain a definite yield value. This change is the resultant of a number of factors, important among these being the concentration of accelerating catalyst introduced just prior to the application of the adhesive together with the temperature at which the hardening takes place and the solvent used in the resin solution. In the present invention acids are used to accelerate the hardening, and the concentration and amount are definitely controlled and the acid is introduced just prior to the application of the adhesive, the solution having been stabilized at the time of its preparation so that there is substantially no change in consistency during storage. The hardening is accomplished at room temperature, 60—95° F., which is very important and advantageous as it greatly simplifies the control of hardening and is of extreme importance in the bonding of thick stacks of panels and of wood joints. In those processes where heated presses are required it is practically impossible to bring all parts of the veneer stack to the same temperature; consequently there are parts which are either overheated or underheated and as a result the final hardened bond is non-uniform throughout. This is particularly true in the bonding of such a poor conductor of heat as wood. Variation in heat will produce marked changes in the viscosity of the resin solution and in those processes where heat and pressure are employed, temperature is a very critical and important factor. This is due to the fact that resin solutions used in these processes are necessarily of rather high consistency since otherwise they tend to flow too readily under heat and pressure and squeeze out from between the plies. Such high consistency solutions are particularly sensitive to changes in temperature. In those portions of the stack which are underheated the resin has insufficient initial flow, consequently it does not spread, but sets or hardens to infusibility before wetting or bonding all areas of the wood. In those portions of the stack which are overheated the resin will have too great an initial flow, the bond will be thin in spots, and the resin will penetrate too deeply into the ply.

The pressure applied to the bond is also a factor in those processes using heat, since the bond in those portions of the stack at too low a temperature will require more pressure to insure flow than in those portions at too high a temperature. As a consequence there may be too great a flow in one portion of the stack and too little in another, thus producing a non-uniform bond. The use of room temperature in connection with low pressures is thus another feature of the present invention which insures uniformity and consequent increased strength of the bond.

It is found that the solvent used in the resin solution of this invention is of great importance and has a marked influence on the usefulness of the adhesive. It is the recognition of this fact which is one of the unique features of this invention; on the characteristics of the solvent depends to a great degree not only the initial consistency of the solution but also the consistency attained during the hardening.

From the standpoint of the present invention the resin solutions when applied to the surface of the veneer should be of low consistency and free flowing, such that they may be spread easily and uniformly over the surface and should hold these characteristics in the pail or reservoir of the spreading machine. The consistency of this resin film should rapidly increase to the desired point after spreading so that the veneer plies may be immediately stacked or the joint made and then should hold that consistency for a desired length of time while the stack is built up and put under pressure or the joint assembled and the hardening process completed. If the consistency does not increase, and pressure is applied to the stack or joint, the resin solution being still fluid will either flow out from between the plies or at the joint or penetrate too deeply ino the pores of the wood, bleed through the veneers and the resin bond between the plies or at the joint will be too thin to impart the greatest strength to the assembly. On the other hand, if the nature of the solution is such that it increases in consistency even at room temperature and approaches the plastic solid state, plies may be stacked or joints assembled almost immediately after the resin solution is applied and then as pressure is applied, the resin film has a finite yield value and will hold its shape under the action of small shearing stresses but can be deformed or molded under somewhat larger stresses. Thus a resistance to flow is set up and there is produced throughout the stack or at the joint, a uniform change of consistency in the resinous film, which results in a uniform resin bond between plies or at the joint penetrating sufficiently and giving, therefore, a bond of the maximum strength.

The present invention provides means to effect this change at room temperature both by the addition of an acid catalyst for the hardening just prior to the application of the adhesive and also by the use of volatile solvent having an evaporation rate coordinated with the consistency and change in consistency. The proportion of the acid catalyst used is a controlling factor of the consistency and the concentration must be adjusted, since too high a concentration will give too rapid an increase in consistency such that the change from fluid to plastic solid and eventually to infusible solid will occur too quickly for commercial operation. The use of completely aqueous acid solutions is also impractical since the water tends to penetrate too deeply into the wood carrying with it the dissolved acid, thus reducing the effective concentration of the acid necessary to advance the viscosity of the resin. Moreover water is not sufficiently volatile at room temperature to be used alone as a solvent.

In the present adhesive the previously mentioned desirable characteristics are attained by the use of an easily evaporable solvent such as alcohol, that is one which readily evaporates at room temperature preferably modified with an evaporation retarder which does not evaporate readily at room temperature, such as water, in controlled percentages. The solvent gives the adhesive the low consistency which enables the adhesive to be spread quite easily and as the surface of the adhesive which is exposed in the pail or reservoir of the spreading machine is relatively small, there is not an excessive evaporation of solvent and consequently the desired consistency is maintained even though the adhesive contains the acid hardener. However, when the adhesive is spread in a thin film on the veneer sheet or joint, the solvent evaporates rather rapidly, thus increasing the consistency rather rapidly to the best bonding condition. The alcohol also acts as a retardant for the hardening reaction between resin and the acid hardener and it so happens that in this adhesive there is a dwell or time interval of minimum hardening between the time that the chemical reaction of resin and acid begins and the time that this reaction begins to manifest itself appreciably by an increase in consistency of the adhesive which is the beginning of the hardening reaction. When the hardening reaction once starts, however, it progresses rather rapidly. Therefore, with the present adhesive, after the solvent has substantially evaporated from the adhesive film the film maintains a good bonding consistency giving the operator ample time to spread the adhesive on other veneer sheets or on the joint and build up a stack in the case of veneers and then apply clamps to the stack to cause penetration of the adhesive into the pores of the wood, before the consistency increases appreciably. The time element of solvent evaporation may be controlled by proportioning the amounts of solvent and solvent retarder, for instance methyl alcohol and water, or by using by itself a suitable solvent of a lower evaporation rate than methyl alcohol, for instance butyl alcohol, or by using a composition of a solvent having a high evaporation rate, for instance methyl alcohol, with a solvent of lower evaporation rate, for instance amyl alcohol. Similarly it is preferred that the acid which is added as the hardener contain ingredients which will give or maintain the balance of solvent ingredients.

The use of acid catalysts in the final hardening of the resin bond has the further advantage of preventing staining or discoloring of the wood veneer since woods are more often stained by alkali than by acid.

Among the objects of the present invention are therefore to provide a resin adhesive of the correct consistency for ease of application, to provide a resin adhesive which attains through the process of solvent evaporation and acid catalyzed hardening a consistency which insures both sufficient penetration of the wood and also a sufficient quantity of resin bond between the plies, methods for controlling the initial consistency of the resin and also methods for controlling the consistency during the hardening of the bond at room or at only slightly elevated temperatures, and at pressures or under the conditions and with the equipment which is at present standard in substantially every plant producing plywood, and a resin adhesive which is substantially stable at the time of its manufacture and in which there will be substantially no change in viscosity during storage prior to its preparation for use. Other objects and features of the invention appear in the explanation of the invention throughout this specification and are pointed out in the claims.

To prepare a resin solution for use as described herein we reflux about 96 parts by weight of 37% formaldehyde solution, 100 parts by weight of phenol, 10 parts by weight of anhydrous sodium sulphite and 15 parts by weight of glycerine for about 75 minutes, thereafter eliminating a portion of the water and adding methyl or ethyl alcohol to give a solution having a viscosity of 1660–1800 k. v. (k. v.=kinematic viscosity= centipoises/specific gravity) with a balanced solvent of about 1 to 2 parts of water to 3 to 2 parts of ethyl or methyl alcohol or a correspondingly balanced mixture of evaporation retarder and evaporable solvent. The viscosity before eliminating the water is about 100 k. v. which is highly desirable for indicating the end of this phase of the reaction. The removal of part of the water is advisedly done since it is desired to replace part of the water of the solution by a volatile solvent which will readily evaporate when the solution is spread on the ply, so that the plies may be stacked or the joints made immediately after application of the adhesive. For joint adhesives the viscosity should be approximately 3000 k. v. with a possible range from 2000 to 4000 k. v.

This solution must now be stabilized so that the change in consistency will be relatively slight in storage, and this we accomplish by adding a certain amount of acid which will render the resin solution non-reactive or only slowly reactive at room temperature. The amount of added acid will vary somewhat, but for the quantity of solution prepared as above described we usually add 10 parts by weight of a solution consisting of 1 part by volume of concentrated hydrochloric acid (36% HCl in water) and 1 part by volume of alhol. To determine whether this stabilized resin solution is sufficiently non-reactive we test it by heating a small portion to 160° C. If it does not become hard and infusible in less than three minutes we consider it sufficiently non-reactive so that it can be stored without substantial change in viscosity, which will be approximately 1800 k. v. at the time of preparation for a veneer adhesive. At the end of a month of storage such a solution should have a viscosity not exceeding 3000 k. v.

Shortly before we are ready to use this solution we mix 100 parts by weight of it with 3 parts by weight of a solution of 1 part by volume of alcohol and 1 part by volume of said hydrochloric acid. This amount of accelerator will usually be found sufficient to give the requisite increase in consistency, such that the change from fluid to a plastic solid in the film as applied occurs in about 15 minutes, which is approximately the time required to assemble the stack of plies and place them under pressure. In larger amounts however, for instance in a pail or the well of a spreading machine, the change from fluid to plastic solid does not occur for several hours—say 3 to 4 hours, giving ample opportunity for a relatively large amount of the adhesive to be mixed and used up before it hardens. Lesser or greater amounts of accelerator may be added, but we have found it advisable not to use less than 1½ parts and not greater than 6 parts. We spread this prepared solution either by a brush, roller or other suitable device onto the wooden surfaces to be joined, the thickness of the deposited film varying from about 3½ to 10 mils.

The film is allowed to air-dry until it is at the proper consistency for the strongest bond, which usually requires about 3 to 6 minutes for veneers under the conditions given where the adhesive has a k. v. of 1600–1800 when applied. When using a more viscous material a correspondingly shorter drying time is required. A convenient test which we have applied to determine when this state of the resin is reached, is the following. Small 6 x 12″ test panels are prepared and coated to a film thickness of about 5–6 mils with the resin adhesive solution of approximately 1800 k. v. which is to be used. Lead shot of the size commonly given as #6–7 is then sprinkled on one of the prepared panels immediately after coating and on the others after certain intervals of air-drying. The panels are then inverted and the time recorded for the shot to fall away from the panels. Generally speaking for the film thickness above stated, shot of the size given will require 8–12 secs. to fall when the required degree of tackiness is reached. The desirability of drying the resinous adhesive to the correct degree of tackiness before bonding is illustrated by the following experiment. Three sets of panels were prepared, using 1800 k. v. adhesive, each consisting of three plies of 1/16 inch redwood veneer, the first set (A) being assembled after the resin adhesive had dried for about 8–10 minutes and reached a stage where shot #6–7 held indefinitely when the panel was inverted; the second set (B) after the resinous adhesive had stood for about 3–6 minutes and reached a stage of tackiness where lead shot #6–7 required about 10 secs. to fall away from the inverted panel and the third set (C) was assembled immediately after being coated and the shot fell off almost immediately when the panel was inverted. The panels were pressed overnight in a hand press at the same pressure and then placed at a temperature of 60° C. for 5 hours. Standard samples cut from these panels were tested for breaking strength both dry and after immersion for one hour in boiling water and tested wet. In every case the best results were obtained by bringing the resin to a state indicated by (B). This was particularly noticeable in wet strength tests where the improvement was as much as 60%. Having once determined the drying time by these simple tests, veneers may thereafter be coated and stacked allowing similar drying times making check tests as desired. The time may, of course, be shortened somewhat by force drying, although this is usually not necessary.

The amount of resin on the surface of the veneer or joint will be approximately .012 lb. to .036 lb. per sq. ft., which is sufficient to give a continuous resin film and bond between the plies or the joined surfaces. After reaching the correct state of tackiness we assemble the coated plies or joints and clamp them under a pressure of about 125 lbs. per sq. inch, although this will vary for different types of wood and may be as low as 20 lbs. and as high as 330 lbs. per. sq. in. The assembly is left under pressure at the usual room temperature of 60–95° F. for about 12 to 18 hours which is sufficient for the bond to harden throughout at least to such a degree that the plywood can be handled and worked without danger of the plies separating. It is convenient to leave the assembly under pressure overnight. We usually then release the pressure, which frees the equipment, and heat the assembled plies in a kiln, preferably in a humid atmosphere, to complete the hardening of the resin bond, say for 3 hours at 140–145° F. The bonding operation may be facilitated to some extent, if desired, by pressing and hardening, say, for 5 hours at 140° F., directly after assembling the plies. Still another variation is to clamp the assembled plies between heated cauls i. e. steel plates of about ¼″ thickness which have been heated by immersion in boiling water or in a steam chest. Or, it is possible to heat the plies themselves to, say, about 140° F. before applying the resinous adhesive. This accelerates the hardening.

Plywood prepared in this manner, when tested by the standard plywood test on 3 ply 1/16″ birch, gave a dry strength of over 400 lbs. per sq. in. and a wet strength which was 85% of the dry strength. The standard maple block shear test gave results of 2500 lbs. per sq. in.

We have found that if a commercial cresol mixture containing approximately equal parts of meta and para cresol with about 5 to 10% of ortho cresol and phenol, is substituted for phenol in equivalent molecular proportions in the above example it is only necessary to reflux for 50 minutes prior to evaporating off part of the solution to obtain the desired viscosity. In general, xylenol and higher homologs are treated similarly to cresol.

If we use other alkalies as condensing agents and a larger proportion of formaldehyde, for example, 75 parts by weight of phenol, 125 parts by weight of 37% formaldehyde and 1 part by weight of anhydrous sodium carbonate, we find it necessary to alter the reflux time in this case to forty minutes and then evaporate off 80 parts by weight of water and add 30 parts of alcohol in order to obtain the desired viscosity of approximately 1600–1800 k. v.

The amount of acid solution required to bring the resin solution to the slowly reactive state is determined as before, and then the stabilized resin solution is ready for use as desired.

We can substitute a cresol mixture for phenol in equivalent molecular proportions in the above example, but then we only reflux for 30 minutes before evaporating off part of the solution.

We can increase the viscosity of the resin solution without increasing the resin concentration by adding from 1–15% of cellulose ester or vinyl ester dissolved in a suitable solvent such as butyl acetate or methyl phthalyl ethyl glycollate. This is often desirable to decrease the penetration of the resin solution, particularly into soft end grain woods. Certain solvents such as propyl, butyl, amyl alcohol, or the higher homologues of ethyl alcohol, may also be used to replace a portion of the methyl or ethyl alcohol used in the resin solution, say, to the extent of 10–25%. Such alcohols exert a beneficial effect by reducing the tendency for the resin solution to "string" between the coating roller and veneer panel.

Other acids, inorganic such as phosphoric, or organic acids such as citric or oxalic, may be used as hardening agents and the amount may be varied as indicated above. While the adhesives herein described are particularly useful for the bonding of veneers, they are also extremely useful as joint adhesives, as an adhesive in the making of paper boxes and cartons, for bookbinding, in the manufacture of abrasive papers or wherever a permanent water resistant binder or adhesive is desired and where, as in the case of joints, the material cannot be submitted to hot pressing. Thus, although the previous description has dealt more or less specifically with veneers, it is obvious that the invention is not limited thereto and that various other modifications and applications may be made; and it is to be understood accordingly that the invention is to be construed as broadly as the claims, taken in conjunction with the prior art, may allow.

What is claimed is:

1. An adhesive for cold gluing wood comprising a synthetic phenolic aldehyde resin and an acidic hardener therefor having a hardening action corresponding to the addition of from 1.5% to 6%, based on the resin, of 18% hydrochloric acid solution to harden the adhesive at room temperature, said adhesive having a viscosity between 1600 and 3000 k. v.

2. An adhesive for cold gluing wood including a mixture comprising as one component a synthetic phenolic aldehyde resin composition stabilized by chemical neutralization of the ingredients to prevent any substantial change in viscosity during storage, and as a second component an acidic hardener having a hardening action corresponding to the addition of from 1.5% to 6%, based on the first named component, of 18% hydrochloric acid solution to harden the adhesive at room temperature.

3. An adhesive for wood veneers and joints including a mixture comprising as one component a synthetic phenolic aldehyde resin stabilized by neutralization of the ingredients to prevent an increase in viscosity beyond 4000 k. v. after one month storage and as a second component an acidic hardener having a hardening action corresponding to the addition of from 1.5% to 6%, based on the first named component, of 18% hydrochloric acid solution to harden the adhesive at room temperature.

4. An adhesive for wood veneers and joints including a mixture comprising as one component a synthetic phenolic aldehyde resin stabilized by neutralization of the ingredients so that a sample heated to 160° C. does not become hard and infusible in less than three minutes and as a second component an acidic hardener having a hardening action corresponding to the addition of from 1.5% to 6%, based on the first named component, of 18% hydrochloric acid solution to harden the adhesive at room temperature.

5. An adhesive for cold gluing wood including a mixture comprising as one component a synthetic phenolic aldehyde resin composition stabilized by chemical neutralization of the ingredients to prevent any substantial change in viscosity during storage, and as a second component an acidic hardener having a hardening action corresponding to the addition of from 1.5% to 6%, based on the first named component, of 18% hydrochloric acid solution to harden the adhesive at room temperature, and as another component a member of the group consisting of cellulose esters and vinyl esters.

6. An adhesive for wood veneers and joints including a mixture comprising as one component a synthetic phenolic aldehyde resin stabilized by neutralization of the ingredients to prevent an increase in viscosity beyond 4000 k. v. after one month's storage, and as a second component an acidic hardener having a hardening action corresponding to the addition of from 1.5% to 6%, based on the first named component, of 18% hydrochloric acid solution to harden the adhesive at room temperature, and as another component a member of the group consisting of cellulose esters and vinyl esters.

7. An adhesive for cold gluing wood including a mixture comprising as one component a synthetic phenolic aldehyde resin composition stabilized by chemical neutralization of the ingredients to prevent any substantial change in viscosity during storage, and as a second component an acidic hardener having a hardening action corresponding to the addition of from 1.5% to 6%, based on the first named component, of 18% hydrochloric acid solution to harden the adhesive at room temperature, and as another component a member of the group consisting of cellulose esters and vinyl esters in a solvent.

8. An adhesive for cold gluing wood including a mixture comprising as one component a synthetic phenolic aldehyde resin composition stabilized by chemical neutralization of the ingredients to prevent any substantial change in viscosity during storage, and as a second component an acidic hardener having a hardening action corresponding to the addition of from 1.5% to 6%, based on the first named component, of 18% hydrochloric acid solution to harden the adhesive at room temperature, and as another component a higher homologue of ethyl alcohol.

9. An adhesive for cold gluing wood comprising a synthetic phenolic aldehyde resin composition stabilized by chemical neutralization of the ingredients to prevent any substantial change in viscosity during storage, an acidic hardener containing an amount of acid corresponding to from 1.5% to 6%, based on the resin composition, of 18% hydrochloric acid solution to harden the adhesive at room temperature, a higher homologue of ethyl alcohol to reduce the string of the adhesive and a viscosity increasing agent selected from the group consisting of cellulose esters and vinyl esters.

10. A veneered or joined body comprising a base, a sheet of wood joined thereto and an adhesive holding the sheet to the base, said adhesive comprising a synthetic phenolic aldehyde resin and an acid hardener for the resin, having a hardening action corresponding to the addition of from 1.5% to 6%, based on the resin, of 18% hydrochloric acid solution to harden the adhesive at room temperature, the adhesive being characterized in that when the base and sheet of wood joined thereto are of maple the shear strength is substantially 2500 lbs. per square inch.

11. A veneered or joined body comprising a base, a sheet of wood joined thereto, and an adhesive holding the sheet to the base, the adhesive being a film from approximately 3½ to 10 mils in thickness and having a viscosity of substantially 1600–3000 k. v. when applied and comprising a synthetic phenolic aldehyde resin and an acid hardener for the resin having a hardening action corresponding to the addition of from 1.5% to 6%, based on the resin, of 18% hydrochloric acid solution to harden the adhesive at room temperature.

12. A veneered or joined body comprising a base, a sheet of wood joined thereto, and an adhesive holding the sheet to the base, the adhesive being a film of approximately .012 to .036 lbs. per sq. ft. of area and having a viscosity of substantially 1600–3000 k. v. when applied and comprising a synthetic phenolic aldehyde resin and an acid hardener for the resin having a hardening action corresponding to the addition of from 1.5% to 6%, based on the resin, of 18% hydrochloric acid solution to harden the adhesive at room temperature.

13. Method of joining two surfaces one of which is wood to produce a veneered or joined body which comprises coating one of the surfaces with an adhesive comprising a synthetic phenolic aldehyde resin and an acidic hardener having a hardening action corresponding to the addition of from 1.5% to 6%, based on the resin, of 18% hydrochloric acid solution to harden the adhesive at room temperature, said adhesive having a viscosity of substantially 1600–3000 k. v., laying the surfaces together with the adhesive as an intermediate layer, and subjecting the assembly to a relatively low pressure of from about 20 to 350 lbs. per sq. inch.

14. Method of joining two surfaces one of which is wood to produce a veneered or joined body which comprises coating one of the surfaces with an adhesive comprising a synthetic phenolic aldehyde resin and an acidic hardener having a hardening action corresponding to the addition of from 1.5% to 6%, based on the resin, of 18% hydrochloric acid solution to harden the adhesive at room temperature, said adhesive having a viscosity of substantially 1600–3000 k. v. and having the property of wetting the surface to which it is applied, laying the surfaces together with the adhesive as an intermediate layer, and subjecting the assembly to pressure.

15. Method of joining two surfaces one of which is wood to produce a veneered or joined body which comprises coating one of the surfaces with an adhesive comprising a synthetic phenolic aldehyde resin and an acidic hardener having a hardening action corresponding to the addition of from 1.5% to 6%, based on the resin, of 18% hydrochloric acid solution to harden a test film of the adhesive to a condition where #6–7 shot sprinkled on the film requires about 10 seconds to fall from the inverted film, laying the surfaces together with the adhesive as an intermediate layer, and subjecting the assembly to pressure.

16. Method of joining two surfaces one of which is wood to produce a veneered or joined body which comprises coating one of the surfaces with a layer from substantially 3½ to 10 mils in thickness of an adhesive comprising a synthetic phenolic aldehyde resin and an acidic hardener having a hardening action corresponding to the addition of from 1.5% to 6%, based on the resin, of 18% hydrochloric acid solution to harden the adhesive at room temperature and a control agent for the hardening having an evaporation rate between that of water and alcohol, laying the surfaces together with the adhesive as an intermediate layer, and subjecting the assembly to pressure.

17. Method of joining two surfaces one of which is wood to produce a veneered or joined body which comprises coating one of the surfaces with an adhesive comprising a synthetic phenolic aldehyde resin and an acidic hardener having a hardening action corresponding to the addition of from 1.5% to 6%, based on the resin, of 18% hydrochloric acid solution to harden the adhesive at room temperature within 12 to 18 hours, the amount of acidic hardener being insufficient to harden the adhesive in a pail within 3 to 4 hours, laying the surfaces together with the adhesive as an intermediate layer, and applying pressure to the assembly while the consistency of the adhesive is substantially uniform over the surfaces to be united.

JOHN H. SCHMIDT.
RALPH T. CASSELMAN.

CERTIFICATE OF CORRECTION.

Patent No. 2,233,875.                                                            March 4, 1941.

JOHN H. SCHMIDT, ET AL.

It is hereby certified that error appears in the printed specification of the above numbered patent requiring correction as follows: Page 3, first column, line 2, for "ino" read --into--; same page, second column, line 56, for "1660-1800" read --1600-1800--; page 4, first column, line 8-9, for "alhol" read --alcohol--; same page, second column, line 35, for "330 lbs." read --350 lbs.--; and that the said Letters Patent should be read with this correction therein that the same may conform to the record of the case in the Patent Office.

Signed and sealed this 3rd day of June, A. D. 1941.

(Seal)                                                      Henry Van Arsdale,
Acting Commissioner of Patents.